US007519616B2

(12) United States Patent
Hayes et al.

(10) Patent No.: US 7,519,616 B2
(45) Date of Patent: Apr. 14, 2009

(54) TIME REFERENCES FOR MULTIMEDIA OBJECTS

(75) Inventors: Sean Hayes, Bristol (GB); Robert K. Hughes, Jr., Shoreline, WA (US)

(73) Assignee: Microsoft Corporation, Redmond, WA (US)

(*) Notice: Subject to any disclaimer, the term of this patent is extended or adjusted under 35 U.S.C. 154(b) by 935 days.

(21) Appl. No.: 10/610,492

(22) Filed: Jun. 30, 2003

(65) Prior Publication Data

US 2004/0068510 A1 Apr. 8, 2004

Related U.S. Application Data

(60) Provisional application No. 60/416,976, filed on Oct. 7, 2002.

(51) Int. Cl.
G06F 7/00 (2006.01)
G06F 17/00 (2006.01)

(52) U.S. Cl. ............... 707/104.1; 707/100; 707/101; 707/102; 707/103 R (58) Field of Classification Search ............ 715/501.1, 715/526, 500; 725/135; 709/231; 707/103 R, 707/104.1, 100–103; 70/104.1
See application file for complete search history.

(56) References Cited

U.S. PATENT DOCUMENTS

| 5,367,621 | A | * | 11/1994 | Cohen et al. ............. 715/501.1 |
| 5,613,134 | A | * | 3/1997 | Lucus et al. ............... 715/526 |
| 5,659,790 | A | * | 8/1997 | Kim et al. ................ 715/500.1 |
| 6,473,096 | B1 | * | 10/2002 | Kobayashi et al. .......... 715/731 |
| 6,490,564 | B1 | * | 12/2002 | Dodrill et al. ............. 704/275 |
| 6,779,154 | B1 | * | 8/2004 | Nussbaum et al. .......... 715/523 |
| 2002/0083469 | A1 | * | 6/2002 | Jeannin et al. ............. 725/135 |
| 2003/0229847 | A1 | * | 12/2003 | Kim ..................... 715/501.1 |
| 2004/0024898 | A1 | * | 2/2004 | Wan ..................... 709/231 |
| 2004/0068536 | A1 | * | 4/2004 | Demers et al. ............. 709/201 |
| 2004/0268224 | A1 | * | 12/2004 | Balkus et al. ............ 715/500.1 |

FOREIGN PATENT DOCUMENTS

WO    WO0118678    3/2001

OTHER PUBLICATIONS

Lloyd Rutledge, CWI, Amsterdam, SMIL 2.0, XML for Web Multimedia, IEEE, Sep. 2001, pp. 78-84.*
XML, A Realist's SMIL Manifesto, Part II, Jul. 17, 2002, pp. 1-15.*

(Continued)

Primary Examiner—John E Breene
Assistant Examiner—Joshua Bullock
(74) Attorney, Agent, or Firm—Lee & Hayes, PLLC (57) ABSTRACT

The present disclosure relates to providing timing references to multimedia objects that are reference by a separate document that contains elements that particular reference the multimedia objects. The elements are associated with other elements that may be part of another external document. The elements of the external document are grouped in time containers that describe when the elements are to be rendered, which describes when the elements of the separate document are to be rendered, and describes when the multimedia objects are to be rendered. Other documents may receive rendition timing from association with the separate document. An event listener element may be included in the external document that is responsive to events affecting elements in the separate document.

37 Claims, 4 Drawing Sheets

OTHER PUBLICATIONS

O'Reilly, XML.com, Online Meetings Made Easy, pp. 1-4.*
SMIL Bosto Animation, Aug. 3, 1999, pp. 1-15.*
W3C, Synchronized Multimedia Integration Language (SMIL) Boston Specification, W3C Working Draft 15, Nov. 1999, pp. 1-7.*
SMIL Timing and Synchronization, Jul. 27, 1999, pp. 1-32.*
Dldier Martin, A Question of Timing, Aug. 2, 2000, pp. 1-4.*
WD SMIL Boston, The SMIL Media Object Module, Jul. 13, 1999, pp. 1-8.*
WD-SMIL, Synchronized Multimedia Integration Language (SMIL) Modules, Jul. 19, 1999, pp. 1-7.*
WD-SMIL Boston, THe SMIL Linkin Module, Jun. 23, 1999, pp. 1-9.*
WD-SMIL Boston, Integrating SMIL Timing into Other XML-Based Languages, Aug. 3, 1999, pp. 1-19.*
WD-SMIL Boston, Sunchronized Multimedia Integratio language (SMIL) Modules, Jul. 19, 1999, pp. 1-7.*
WD-SMIL Boston, Synchronized Multimedia Integration Language (SMIL) Document Object Model, Aug. 3, 1999, pp. 1-16.*
Fabio Arciniegas, A Realist's SMIL Manifesto, May 29, 2002, pp. 1-9.*
Rutledge; "SMIL 2.0: XML for Web Multimedia"; IEEE Internet Computing; vol. 5, No. 5; Sep. 2001; pp. 78-84; ISSN: 1089-7801.

* cited by examiner

TIME REFERENCES FOR MULTIMEDIA OBJECTS

PRIORITY TO PROVISIONAL APPLICATION

This application claims priority to provisional application serial No. 60/416,976 filed Oct. 7, 2002.

TECHNICAL FIELD

The systems and methods described herein relate to associating time with multimedia objects and specifically to systems and methods that provide and/or redefine time references for multimedia objects.

BACKGROUND

Multimedia presentations are made up of discrete multimedia or audio video (A/V) objects (multimedia objects). Multimedia objects may originate from one source such as a digital versatile disc (DVD) disc played on a drive on a personal computer (PC). In other cases multimedia objects may originate from (i.e., streamed from) multiple sources and played at a common destination. For example, multimedia objects may originate from multiple websites and played at a PC. Multimedia presentations may include and combine multimedia objects from videotape, a television broadcast, DVD, and from a website on the Internet (i.e., evolving web broadcast).

Multimedia objects include A/V frames, pictures, video clips, audio clips, and audio samples. Various formats may describe multimedia objects and include static image, animation, video, and text formats. Static image formats include portable network graphics (PNG), joint photographic experts group (JPEG), and motion picture experts group (MPEG). Animation formats include multiple-image network graphics (MNG). Video formats include MPEG video, audio video interleave (AVI) and various streaming formats. Text formats include extensible markup language (XML), hypertext markup language (HTML), and extensible HTML (XHTML).

Synchronized multimedia integration language (SMIL) is a declarative language for describing structural, spatial and temporal effects such as animation in a presentation. A SMIL listing or document describes when multimedia objects are displayed. In particular, a SMIL document makes use of "time containers" that group data (i.e., multimedia objects). SMIL time containers include a tag <par> which "plays" pieces of data in parallel (i.e., the same time); a tag <seq> which plays data sequentially (i.e. one after the other in the time container list); and a tag <excl> which plays a piece of data exclusive of other data (i.e., no particular sequence).

Although data or media objects may originate from one or multiple sources, when using SMIL, data or media objects must be "linked" together by a single SMIL document. In other words, the single SMIL document is needed to link multimedia objects with one another.

An "element" is a basic unit of an XML document. An element can include other elements and text, and begins with an opening tag <name>, and ends with a closing tag </name>. Tags that begin with <?, and end with ?> are processing instructions that specify particular style sheets to be used. Style sheets are distinct documents that define format for tags of an XML document.

XML tags identify and describe data or multimedia objects that are contained in or referenced by the element. Attributes in the element further describe the purpose and content of data or multimedia elements of the element. Data that is part of an XML document, in particular an element, is available to other XML documents.

Associated with an XML document are schemas used to describe which tags may be used in which XML documents. Such schemas include tag formatting performed by eXtensible Stylesheet Language for Formatting Objects (XSL-FO) or cascading style sheets.

An XSL-FO document is a transformed XML document that contains information as to structure and appearance.

External style sheets may be provided as a reference for documents as to structure and appearance information. In other words, external style sheets provide the ability to describe appearance and structure of objects in other documents; however, external style sheets and XML documents do have the ability to describe when objects are to be played or presented.

XML does not provide temporal reference for multimedia objects. SMIL provides the temporal reference for multimedia objects; however, SMIL is relatively inflexible and requires that multimedia objects be reference directly by a single SMIL document. In other words, unlike extensible textual markup languages like XML, SMIL does not allow documents to control other documents.

SUMMARY

The systems and methods described herein include referencing multimedia objects by elements in a document, wherein those elements are further associated with other elements which are arranged to indicate a rendition timing.

In certain embodiments an external document is used to provide the rendition timing.

Particular embodiments provide that the external document is made aware of events affecting the document.

DETAILED DESCRIPTION

Figure 1:
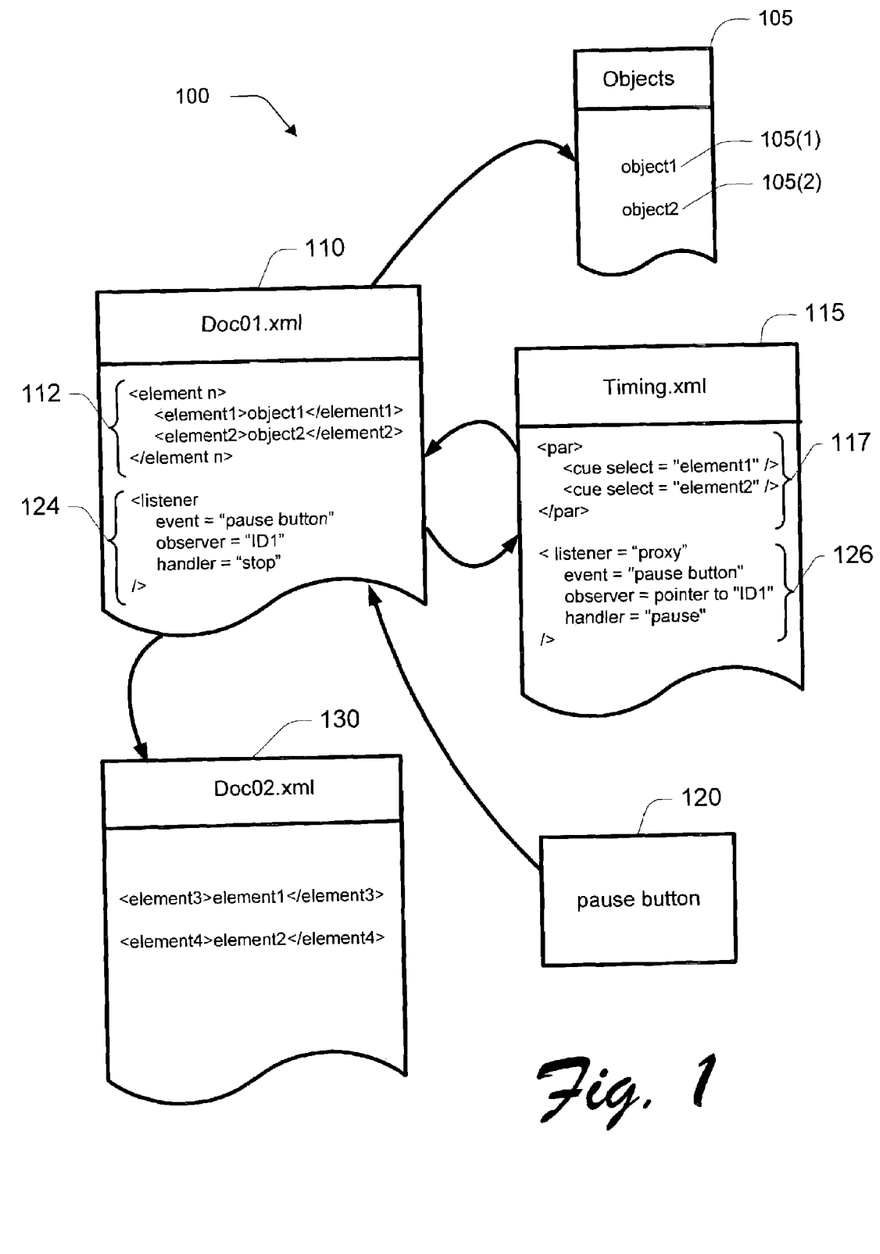
FIG. 1 is a block diagram illustrating a multimedia presentation described by a relationship of objects, content documents, a timing document, and events affecting elements in a content document.

FIG. 1 shows documents and objects that are used to define a multimedia presentation 100. Multimedia presentation 100 includes objects 105. Objects 105 may be one or more multimedia objects which are described by various formats that include static image, animation, video, and text formats. Formats may include PNG, JPEG, MPEG, MNG, AVI, XML, HTML, and XHTML. In this example objects 105 include object1 105(1) and object2 105(2). Although shown as a group and originating from a single source (i.e., objects 105), object1 105(1) and object2 105(2) may originate from different sources.

The multimedia presentation 100 includes document Doc01.xml 110. Doc01.xml is a "content document" that is formatted in a textual markup language such as XML or SGML (HTML). Doc01.xml 110 includes tagged elements that reference multimedia objects. The tagged elements of Doc01.xml 110 are element1 and element2. In this example, the tagged elements of Doc01.xml 110 reference object1 105(1) and object2 105(2). A parent element, element n; may include element1 and element2. Element n is considered one level up from element1 and element2.

An identifier may be used by Doc01.xml 110 to identify element n. Such an identifier may be "ID1". Unique identifiers may also be used to identify element1 and element2.

The elements of Doc01.xml 110 as shown as shown as group 112 in FIG. 1 are listed as follows:

```
<element n>
    <element1>object1</element1>
    <element2>object2</element1>
</element n>
```

In other embodiments element1 and element2 are grouped separately.

Multimedia presentation 100 further includes a document Timing.xml 115. Although Doc01.xml 110 and Timing.xml 115 are logically distinct document types, they may be packaged together as a single logical file. Timing.xml 115 is a "timing document" that may also formatted in a textual markup language such as XML. Timing.xml 115 includes a time container 117 that describe the behavior of element1 and element2 of Doc01.xml 110. Time containers provide rendition timings for elements that may in turn reference multimedia objects. Time container 117 of Timing.xml 115 as shown in FIG. 1 is listed as follows:

```
<par>
    <cue select = "element1" />
    <cue select = "element2" />
</par>
```

The element "cue" is used to target or reference specific elements in a timed document. In this example, "cue" is used to reference element1 and element2 of Doc1.xml 110. Doc1.xml 110 is considered a timed document.

Time container 117 illustrated in Timing.xml 115 includes an element "par" which is used to group elements, and in particular the "cue" elements that reference element1 and element2. A time container with the element "par" provides that elements of the time container are rendered or played at the same time or in parallel with one another. Therefore, in the example listed above, through the use of "cue", element1 and element2 are played or rendered beginning at the same time. Since element1 references object1 105(1), and element2 references objects 105(2), object1 105(1) and object2 (105(2) are, played or rendered at the same time.

Time containers may also use elements "seq" and "excl" to group particular elements, and multimedia objects referenced by those particular elements. An example of a time container with the element "seq" is as follows:

```
<seq>
    <cue select = "element1" />
    <cue select = "element2" />
</seq>
```

In the time container above containing the element "seq", element1 is rendered or played before element2 in the sequence they are listed in the time container. In other words, element1 is rendered after element2 in an ordered list. Multimedia objects referenced by element1 will be rendered or played before 9 multimedia objects referenced by element2.

An example of a time container with the element "excl" is as follows:

```
<excl>
    <cue select = "element1" />
    <cue select = "element2" />
</excl>
```

In the time container above containing "excl", element1 may be rendered or played before or after element2. The element "excl" provides that element1 or element2 are rendered or played exclusive of one another. It does not matter which order the elements are listed in the time container. Multimedia objects referenced by element1 are rendered or played exclusive of multimedia objects referenced by element2. The time containers, in particular, may use SMIL conventions, with the addition of the <cue> element. The <cue> element in the timing document Timing.xml 115 may have child elements which may describe actions applied to another element "elementi" in the timed document Doc1.xml 110.

An event may take place that affects elements in the timed document Doc01.xml 110. An event is special object that is created when something occurs such as an input from a user. An example of an event is a user pausing play by activating a "pause button".

Events in Doc01.xml may be handled through "EventListener" document object model (DOM) constructs as defined by the World Wide Web Consortium (W3C). In particular, events may be looked for and handled through a construct defining an element "listener".

In this example an event "pause button" 120 takes place and may affect element1 or element2 of Doc01.xml 110. Doc1.xml 110 may include a listener element 124 that is listed as follows:

```
<listener
    event = "pause button"
    observer = "ID1"
    handler = "stop"
/>
```

The listener element 124 is configured to watch for the event "pause button" 120. "ID1" identifies element n which might be for example, one of element1 or element2. An element may be a "target" which is affected by the event. For example, element1 and/or element2 may be a target element affected by event "pause button" 120. An "observer" element may or may not be a target element, but is made aware of an event that affects elements (i.e., target elements) that are levels below it (i.e., are children elements of a parent observer element). For example, element n may be an observer when element1 and element2 are targets. The observer attribute in element 124 uses the identifier "ID1" to identify element n.

An attribute "handler" is activated when an event occurs in the target element. In this example, the attribute handler names an application "stop" to be activated. The application "stop" may be a defined instruction within Doc01.xml to instruct elements to pause play.

Since timing document Timing.xml 115 defines timing for timed document Doc01.xml 110, it may be made aware of event "pause button" 120 affecting elements in Doc01.xml 110.

Timing.xml 115 is provided a proxy listener element 126 that is listed as follows:

```
<listener = "proxy"
    event = "pause button"
    observer = pointer to "ID1"
    handler = "pause"
/>
```

Proxy listener 126 is also configured to look for the event "pause button" 120. Instead of an observer attribute that directly identifies element n through identifier "ID1" a pointer to "ID1" is used in an observer attribute of proxy listener element 126. In this example the observer attribute of proxy listener element 126 is extended to be a selector (i.e., using a pointer such as Xpointer in XML). The syntax "ID1" refers to the identifier of an element (i.e., elementn) in Doc01.xml 110, not an element in Timing.xml 115. An attribute handler may be activated when event "pause button" 120 occurs in a target element (e.g., element1 or element2). In proxy listener 126, the attribute handler names an application "pause" which instructs time container 117 to pause play.

Proxy listener element 126 in the timing document Timing.xml 115 does not require or rely on having the listener element 124 in Doc01.xml. Proxy listener element 126 points directly at the element using the pointer to "ID1".

Doc01.xml 110 may include the behavior of another content document, and specifically elements of the other content document. In this example, element1 and element 2 of Doc01.xml 110 include the behavior of element3 and element4 of Doc02.xml 130.

The elements of Doc02.xml 130 as shown in FIG. 1 are shown conceptually as follows:

```
<element3>element1</element3>
<element4>element2</element4>
```

In this arrangement Doc02.xml may be associated with its own timing document (i.e., a separate Timing2.xml). Both Doc01.xml and Doc02.xml may use the same timing document; however typically this may be a special case of a more general arrangement. Timing document Timing.xml 115 may directly apply to a number of content documents, either directly or indirectly. If timing changes need to be made, they are made to timing document Timing.xml 115 or Timing.xml 115 may be replaced by another timing document that references elements in Doc01.xml 110.

Although Timing.xml 115 is illustrated as an XML document, alternative timing document constructs may apply. For example, a cascading style sheet (CSS) may be used. CSS is defined by the W3C and is a language for completely describing an XML content document.

Rendition Timing for Multimedia Objects

Figure 2:
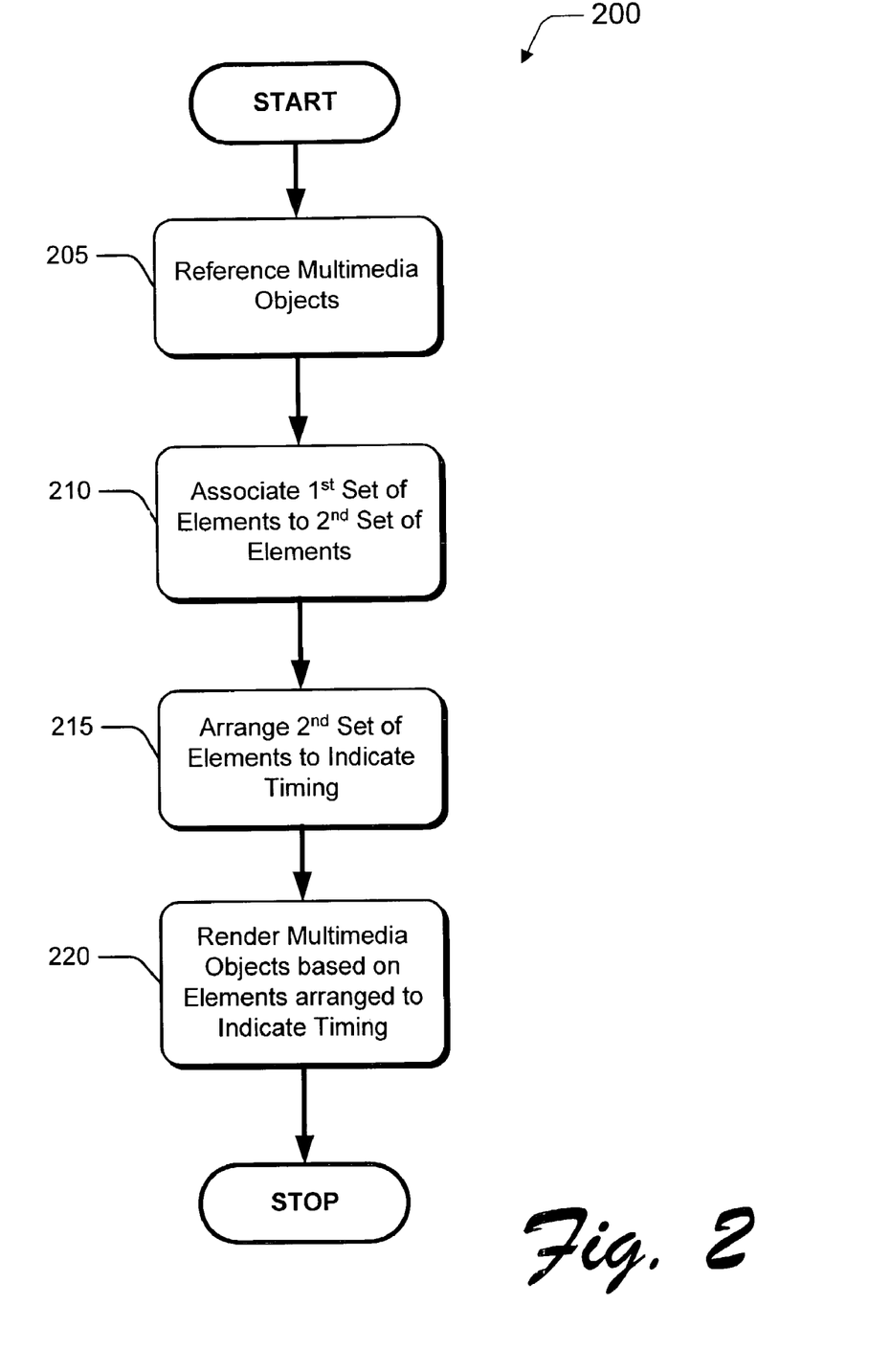
FIG. 2 is a flow chart illustrating how multimedia objects are provided a rendition timing.

FIG. 2 shows a process 200 that provides rendition timing to multimedia objects.

At block 205, a first set of elements, which may be in a document written in an extensible textual markup language such as XML document Doc01.xml 110 of FIG. 1, references one or more multimedia objects which may originate from one or more sources. The reference may be performed by particularly calling out the multimedia objects in elements of the document. The reference may also be performed through the use of pointers in the elements directed to the multimedia objects.

At block 210, the first set of elements are associated to a second set of elements which are arranged to indicate timing. The second set of elements may be part of a the first document, where the first document may be an XSL-FO file. In other cases, the second set of elements is in second document such as an external style sheet.

At block 215, the second set of elements are arranged to indicate timing. In particular the arrangement is performed through the use of a time container, such as illustrated in timing document Timing.xml 115 of FIG. 1. As described above, the element "cue" is used in timing document Timing.xml 115 to associate elements in the first document Doc01.xml 110.

At block 220, the multimedia objects are rendered based on timing arrangement of the second set of elements, since the second set of elements are associated with first set of elements which reference the multimedia objects.

Exemplary System

Figure 3:
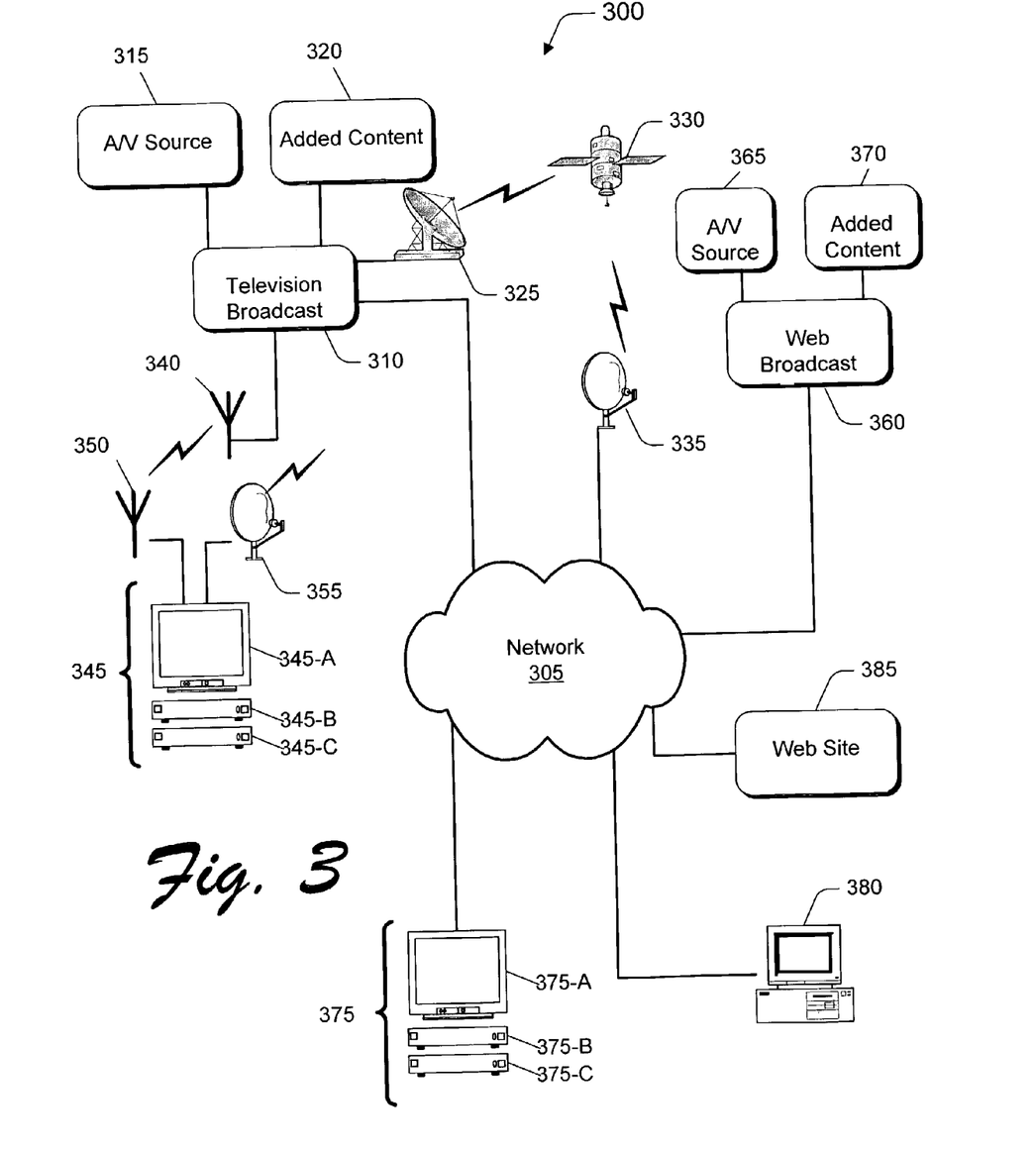
FIG. 3 is a block diagram illustrating a system of multimedia broadcasters providing multimedia objects and presentations to a network connected to multimedia devices to play the multimedia objects and presentations.

FIG. 3 shows a system 300 of multimedia devices and broadcasters to provide multimedia objects and multimedia presentations. It is contemplated that each multimedia object be identified by a particular name. The name may be located in a header or in a file listing of the multimedia object, and may be read by a multimedia device.

A network 305 includes local area, wide area, private, and public private networks, including the Internet. Hardwired (e.g., cable) and/or wireless networks may make up network 305. Network 305 is designed to provide communications (i.e., multimedia objects) from and to various entities.

A television broadcast point 310 provides multimedia presentation in system 300. Television broadcast point 310 plays multimedia objects from an A/V source 315. Television broadcast point 310 may intersperse multimedia objects from A/V source 315 with multimedia objects such as commercials or promotions from an added content source 320.

Television broadcast point 310 is connected to a satellite dish 325 which uplinks to a satellite 330. Satellite dish 325 transmits signals carrying multimedia objects to satellite 330. A satellite dish 335 downlinks the signals carrying multimedia objects from satellite 130. Network 305 is directly connected to satellite dish 335 to receive the multimedia objects. Alternatively network 305 may be directly connected to television broadcast point 310. Television broadcast point 310 may also transmit radio frequency (RF) signals carrying the multimedia objects through an antenna 340. Such RF signals may be received by various multimedia devices that include televisions.

A multimedia device 345 is a standalone unit not coupled to network 305, but is able receive the multimedia objects from television broadcast point 310. Multimedia device 345 includes an A/V display unit 345-A, which may be a television set or monitor with a tuner and A/V inputs and outputs. Multimedia device 345 may further include a multimedia player 345-B such as a DVD player, and a multimedia recorder 345-C. Multimedia device 345 is connected to an antenna 350 that receives RF signals from sources such as antenna 340, where the RF signals carry multimedia objects. Multimedia objects may further be received by multimedia device 345 through a satellite dish 355, where satellite dish 355 receives signals from satellite 330. The multimedia objects and may be recorded by multimedia recorder 345-C.

Broadcast of multimedia objects may also be performed through the Internet. Typically, this is known as a "web broadcast" and provides digital transmission of multimedia objects. A web broadcast point 360 may include an interactive web site accessible through network 305. Web broadcast 360 receives multimedia presentation from an A/V source 365 with interspersed multimedia objects from an added content source 370. Alternatively such objects may come from other sources.

Web broadcast point 360 delivers multimedia objects to network 305 for access by various multimedia devices connected to network 305. Alternatively, web broadcast point 360 may deliver multimedia objects through a satellite as described above.

A multimedia device 375 is coupled to network 305 and receives multimedia objects from various sources including television broadcast point 310 and web broadcast point 360. Multimedia device 375 includes an A/V display unit 375-A which may be a television set or monitor with a tuner and A/V inputs and outputs. Multimedia device 375 may further include a multimedia player 375-B such as a DVD player, and a multimedia recorder 375-C. Multimedia objects and interspersed multimedia objects may be recorded by multimedia recorder 375-C. Multimedia devices and standalone units include WebTV units, and personal video recorder (PVR) units. A personal computer 380 may also be considered a multimedia device.

A web site 385 illustrates a source from which a multimedia device accesses additional content such as updated files that may include timing documents such as Timing.xml 110 of FIG. 1. Broadcast points such as television broadcast point 310 and web broadcast point 360 may stream new multimedia objects to be sequenced with pre-existing content at various multimedia devices.

Exemplary Computer (Multimedia Device) Environment

The subject matter is described in the general context of computer-executable instructions, such as program modules, being executed by one or more multimedia devices such as multimedia devices 345, 375, and 380 of FIG. 3. Generally, program modules include routines, programs, objects, components, data structures, etc. that perform particular tasks or implement particular abstract data types. Moreover, those skilled in the art will appreciate that the subject matter may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Figure 4:
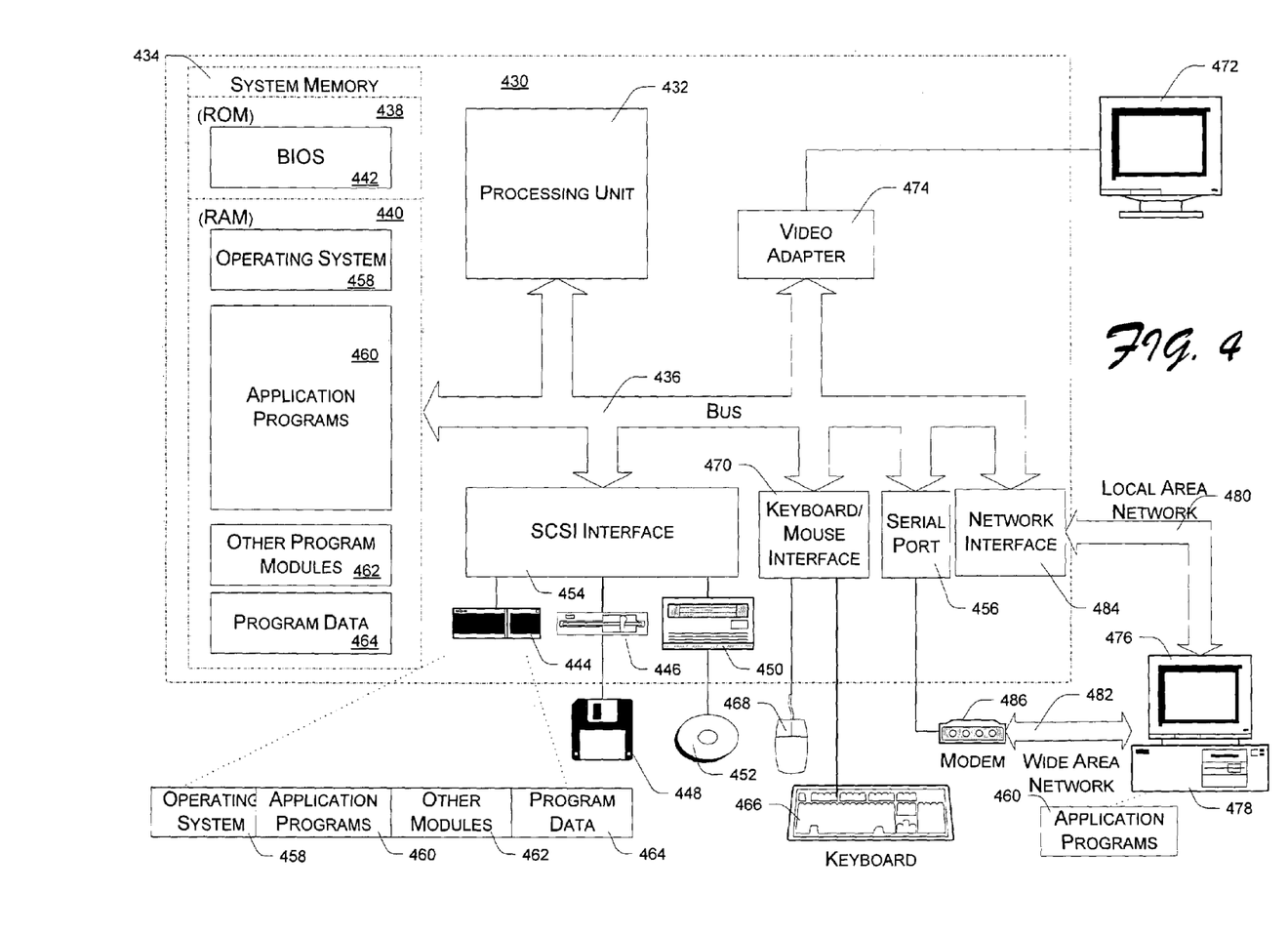
FIG. 4 is a block diagram illustrating a general example of a computer that may be used as a multimedia device to play multimedia objects based on rendition timings.

FIG. 4 shows a general example of a computer 430 that is used in accordance with the subject matter. Computer 430 is shown as an example of a computer that can perform the functions of a multimedia device. Computer 430 includes one or more processors or processing units 432, a system memory 434, and a bus 436 that couples various system components including the system memory 434 to processors 432.

The bus 436 represents one or more of any of several types of bus structures, including a memory bus or memory controller, a peripheral bus, an accelerated graphics port, and a processor or local bus using any of a variety of bus architectures. The system memory includes read only memory (ROM) 438 and random access memory (RAM) 440. A basic input/output system (BIOS) 442, containing the basic routines that help to transfer information between elements within computer 430, such as during start-up, is stored in ROM 438. Computer 430 further includes a hard disk drive 444 for reading from and writing to a hard disk, not shown, a magnetic disk drive 446 for reading from and writing to a removable magnetic disk 448, and an optical disk drive 450 for reading from or writing to a removable optical disk 452 such as a CD ROM or other optical media. The hard disk drive 444, magnetic disk drive 446, and optical disk drive 450 are connected to the bus 436 by an SCSI interface 454 or some other appropriate interface. The drives and, their associated computer-readable media provide nonvolatile storage of computer readable instructions, data structures, program modules and other data for computer 430.

Although the exemplary environment described herein employs a hard disk, a removable magnetic disk 448 and a removable optical disk 452, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 448, optical disk 452, ROM 438, or RAM 440, including an operating system 458, one or more application programs 460, other program modules 462, and program data 464.

A user may enter commands and information into computer 430 through input devices such as keyboard 466 and pointing device 468. Other input devices (not shown) may include a microphone, joystick, game pad, satellite dish, scanner, or the like. These and other input devices are connected to the processing unit 432 through interface 470 that is coupled to bus 436. Monitor 472 or other type of display device is also connected to bus 436 via an interface, such as video adapter 474.

Computer 430 operates in a networked environment using logical connections to one or more remote computers, such as a remote computer 476. The remote computer 476 may be another personal computer, a server, a router, a network PC, a peer device or other common network node, and typically includes many or all of the elements described above relative to computer 430, although only a memory storage device 478 has been illustrated in FIG. 4. The logical connections depicted in FIG. 4 include a local area network (LAN) 480 and a wide area network (WAN) 482. Such networking environments are commonplace in offices, enterprise-wide computer networks, intranets, and the Internet.

When used in a LAN networking environment, computer 430 is connected to the local network 480 through a network interface or adapter 484. When used in a WAN networking environment, computer 430 typically includes a modem 486 or other means for establishing communications over the wide area network 482, such as the Internet. The modem 486, which may be internal or external, is connected to the bus 436 via a serial port interface 456. In a networked environment, program modules depicted relative to the personal computer 430, or portions thereof, may be stored in the remote memory storage device. It will be appreciated that the network connections shown are exemplary and other means of establishing a communications link between the computers may be used.

Generally, the data processors of computer 430 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory.

The subject matter described herein includes these and other various types of computer-readable storage media when such media contain instructions or programs for implementing the steps described below in reference to FIG. 4 in conjunction with a microprocessor or other data processor.

The subject matter also includes the computer itself when programmed according to the methods and techniques described below. Furthermore, certain sub-components of the computer may be programmed to perform the functions and steps described below. The subject matter includes such sub-components when they are programmed as described. In addition, the subject matter described herein includes data structures, described below, as embodied on various types of memory media.

For purposes of illustration, data, programs and other executable program components, such as the operating system are illustrated herein as discrete blocks, although it is recognized that such programs and components reside at various times in different storage components of the computer, and are executed by the data processor(s) of the computer.

Although the invention has been described in language specific to structural 9 features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method performed by a computer comprising:
    referencing one or more multimedia objects through a first set of one or more elements in a content document;
    associating, in a timing document that is separate from the content document, the first set of one or more elements with a second set of one or more elements in the timing document by referencing at least a portion of the first set of one or more elements to one or more elements in the second set of one or more elements;
    arranging the second set of one or more elements in the timing document to indicate timing for the multimedia objects referenced by the first set of one or more elements;
    receiving an input to initiate an event affecting an element in the first set of one or more elements in the content document;
    providing a proxy element in the second set of elements in the timing document that is configured to reference application of the event; and
    rendering the multimedia objects based on the arranging of the second set of one or more elements.

2. The method of claim 1 wherein the referencing is performed by pointers in the first set of one or more elements that point to the multimedia objects.

3. The method of claim 1 wherein the arranging is performed through a time container that defines the second set of one or more elements.

4. The method of claim 3 wherein the time container is defined by SMIL conventions.

5. The method of claim 3 wherein the time container defines that the elements of the second set of one or more elements are rendered at the time.

6. The method of claim 3 wherein the time container defines that the elements of the second set of one or more elements are rendered one after another in an ordered list.

7. The method of claim 3 wherein the time container defines that the elements of the second set of one or more elements are rendered exclusive of one another.

8. The method of claim 1 further comprising associating the second set of one or more elements with a third set of one or more elements.

9. The method of claim 1 wherein the content document and the timing document are written in XML.

10. The method of claim 1 wherein the content document is written in XML, and the timing document is a style sheet.

11. The method of claim 1 wherein the arranging is performed through a time container that defines the second set of one or more elements.

12. The method of claim 11 wherein the time container is defined by SMIL conventions.

13. The multimedia device that performs the method of claim 1.

14. A method performed by a computer comprising:
    referencing one or more multimedia objects through a first set of one or more elements in a first document;
    associating the first set of one or more elements in the first document to a second set of one or more elements in a second document that is separate from the first document, the associating comprising referencing at least a portion of the first set of one or more elements to one or more elements in the second set of one or more elements;
    arranging the second set of one or more elements of the second document to indicate timing for the multimedia objects referenced by the first set of one or more elements in the first document;
    receiving an input to initiate an event affecting an element in the first set of one or more elements of the first document;
    providing a proxy element in the second document that is configured to reference initiation of the event; and
    rendering the multimedia objects based on the arranging of the second set of one or more elements.

15. The method of claim 14 wherein the referencing is performed by pointers in the first set of one or more elements in the first document that point to the one or more multimedia objects.

16. The method of claim 14 wherein the arranging is performed through a time container that defines the second set of one or more elements.

17. The method of claim 16 wherein the time container is defined by SMIL conventions.

18. The method of claim 16 wherein the time container defines that the elements of the second set of one or more elements are rendered at the time.

19. The method of claim 16 wherein the time container defines that the elements of the second set of one or more elements are rendered one after another in an ordered list.

20. The method of claim 16 wherein the time container defines that the elements of the second set of one or more elements are rendered exclusive of one another.

21. The method of claim 14 further comprising associating the second set of one or more elements in the second document to a third set of one or more elements in a third document.

22. The method of claim 21 wherein the first, second, and third documents are written in XML.

23. The method of claim 14 wherein the first and second documents are written in XML.

24. The method of claim 14 wherein the first document is written in XML, and the second document is a style sheet.

25. The method of claim 14 wherein the arranging is performed through a time container that defines the second set of one or more elements in the second document.

26. A multimedia device that performs the method of claim 14.

27. A multimedia device comprising:
a processor; and
instructions stored in a memory and executable on the processor configured to associate a first document with a second document that is separate from the first document through referencing at least a portion of a first set of elements in the first document in at least a portion of a second set of elements in the second document wherein the first set of elements reference multimedia objects and the second set of elements are arranged to provide a rendition timing for the multimedia objects; and
wherein the instructions are further configured to:
receive an input to initiate an event affecting an element in the first set of one or more elements in the first document
provide a proxy element in the second set of elements in the second document that is configured to reference application of the event; and
render the multimedia objects based on the arranging of the second set of one or more elements.

28. The multimedia device of claim 27 wherein the rendition timing is a time container.

29. The multimedia device of claim 27 wherein the time container is defined by SMIL conventions.

30. The multimedia device of claim 27 wherein the instructions are further configured to associate a third set of elements in a third document with the second set of elements in the second document.

31. The multimedia device of claim 27 wherein the instructions are further configured to associate the first set of elements in the first document with a third set of elements in a third document.

32. A system comprising:
one or more processors; and
one or more computer-readable media storing data structures executable on the one or more processors, the executable data structures comprising:
a first content document formatted in a textual markup language having tagged elements that reference one or more multimedia objects; and
a timing document formatted in a textual markup language having a plurality of tagged elements; at least some of the tagged elements of the timing document referencing the elements of the first content document; and the tagged elements of the timing document specifying rendition timings for the multimedia objects referenced by the tagged elements of the first content document;
wherein the plurality of tagged elements of the timing document includes a proxy element configured to reference application of an event affecting an element in the tagged elements of the content document in response to receiving an input to initiate the event.

33. The system of claim 32 wherein the rendition timings are defined by time containers.

34. The system of claim 32 further comprising a second content document formatted in a textual markup language having tagged elements that reference the tagged elements of the first content document.

35. A system comprising:
one or more processor; and
one or more computer-readable media storing data structures executable on the one or more processors, the executable data structures comprising:
a first document formatted in a textual markup language having tagged elements that reference one or more multimedia objects; and
a second document formatted in a textual markup language having a plurality of tagged elements; at least some of the tagged elements of the second document referencing the tagged elements of the first document, wherein the tagged elements of the second document specify rendition timings for the multimedia objects that are referenced by the tagged elements of the first document;
wherein the plurality of tagged elements of the second document includes a proxy element configured to reference application of an event affecting an element in the tagged elements of the first document in response to receiving an input to initiate the event.

36. A system comprising:
a broadcast point providing multimedia objects; and
a multimedia device that receives the multimedia objects, a first document that references the multimedia objects through a first set of one or more elements, and a second document, separate from the first document, that: (i) is associated with the first document through referencing of at least a portion of the first set of one or elements of the first document in a second set of one or more elements in the second document; and (ii) provides rendition timing for the multimedia objects through arrangement of the second set of one or more elements in the second document;
wherein the multimedia device further receives an input that initiates an event in the first document, and informs the second document.

37. The system of claim 36 wherein the multimedia device further receives a third document referenced by the second document.

* * * * *